(12) United States Patent
Xie et al.

(10) Patent No.: US 9,276,618 B1
(45) Date of Patent: Mar. 1, 2016

(54) SYSTEMS AND METHODS FOR SIDELOBE CANCELLATION

(71) Applicant: Marvell International Ltd., Hamilton (BM)

(72) Inventors: Jin Xie, Longmont, CO (US); Kapil Jain, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 15 days.

(21) Appl. No.: 14/263,556

(22) Filed: Apr. 28, 2014

Related U.S. Application Data

(60) Provisional application No. 61/819,299, filed on May 3, 2013, provisional application No. 61/899,421, filed on Nov. 21, 2013.

(51) Int. Cl.
*H04B 1/06* (2006.01)
*H04B 1/10* (2006.01)
*H04B 1/18* (2006.01)

(52) U.S. Cl.
CPC .................................. *H04B 1/10* (2013.01)

(58) Field of Classification Search
CPC ............. H04B 1/12; H04B 1/126; H01Q 3/26
USPC ........... 455/272, 273, 276.1, 278.1, 296, 303, 455/304
See application file for complete search history.

(56) References Cited

U.S. PATENT DOCUMENTS

| 5,659,584 | A | * | 8/1997 | Uesugi et al. | 375/347 |
| 5,760,740 | A | * | 6/1998 | Blodgett | 342/362 |
| 2009/0310652 | A1 | * | 12/2009 | Schilling | 375/147 |

OTHER PUBLICATIONS

Osamu Hoshuyama, et al., "A Robust Adaptive Beamformer for Microphone Arrays with a Blocking Matrix Using Constrained Adaptive Filters", IEEE Transactions on Signal Processing, vol. 47, No. 10, pp. 2677-2684, Oct. 1999.
C.W. Farrow, "A Continuously Variable Digital Delay Element", Proc. Int. Symp. Circuits and Systems (ISCAS), vol. 3, pp. 2641-2645, Jun. 1988.

* cited by examiner

*Primary Examiner* — Lee Nguyen

(57) ABSTRACT

Systems and methods are provided for performing noise filtering of a received signal. A first antenna is configured to capture a first signal. A second antenna is configured to capture a second signal, desired signal arrives at the two antennas at about the same time, where noise received from directions other than the expected signal direction is received at the first antenna and the second antenna at different times. A signal processor is configured to generate a averaged signal based on the first signal and the second signal, subtract the averaged signal from the first signal to generate a noise indicating signal, perform a phase adjustment on the averaged signal based on the noise indicating signal, and subtract the phase adjusted signal from the first signal to adjust the noise indicating signal. The noise indicating signal is filtered and then subtracted from the averaged signal to generate a filtered output signal.

18 Claims, 8 Drawing Sheets

SYSTEMS AND METHODS FOR SIDELOBE CANCELLATION

CROSS-REFERENCE TO RELATED APPLICATIONS

The present application claims priority from U.S. Provisional Application Ser. No. 61/819,299 entitled "Improved Robust General Sidelobe Canceller," filed 3 May 2013, and U.S. Provisional Application Ser. No. 61/899,421 entitled "Improved Robust General Sidelobe Canceller," filed 4 Nov. 4, 2013, the entirety of both of which is hereby incorporated by reference.

FIELD

This disclosure is related generally to wireless signal processing and more particularly to wireless receiver noise filtering.

BACKGROUND

Wireless communication channels often introduce some level of noise to a signal being transmitted. Such noise can reduce the achievable bandwidth of the communication channel or may corrupt the transmitted signal so much that the transmitted signal cannot be understood at the receiver. Noise filtering can be performed at a receiver in an attempt to restore signal quality such that the transmitted signal can be extracted and outputted by the receiver.

SUMMARY

Systems and methods are provided for performing noise filtering of a received signal. A first antenna is configured to capture a first signal. A second antenna is configured to capture a second signal. The signal from the expected direction is the desired signal. It arrives at the two antennas at the same time. Signal from a direction other than the expected direction is undesired and is noise. Noise is received at the first antenna and the second antenna at different times. A signal processor is configured to generate a combined signal based on the first signal and the second signal, subtract the combined signal from the first signal to generate a noise indicating signal, perform a phase adjustment on the combined signal based on the noise indicating signal, and subtract the phase adjusted signal from the first signal to obtain the noise indicating signal. The noise indicating signal is subtracted from the combined signal to generate a filtered output signal, which is the desired signal.

As another example, in a method for performing noise filtering of a received signal, a first signal is received via a first antenna. A second signal is received via a second antenna. The signal from the expected direction is the desired signal. It arrives at the two antennas at the same time. Signal from a direction other than the expected direction is undesired and is noise. The noise is received at the first antenna and the second antenna at different times. A combined signal is generated based on the first signal and the second signal. The combined signal is subtracted from the first signal to generate a noise indicating signal. A phase adjustment is performed on the combined signal based on the noise indicating signal, and the phase adjusted signal is subtracted from the first signal to obtain the noise indicating signal. The noise indicating signal is subtracted from the combined signal to generate a filtered output signal, which is the desired signal.

As a further example, a system for performing noise filtering of a received signal includes a first antenna that is configured to capture a first signal. A second antenna is configured to capture a second signal. The signal from the expected direction is the desired signal. It arrives at the two antennas at the same time. Signal from a direction other than the expected direction is undesired and is noise. The noise is received at the first antenna and the second antenna at different times. An adder is configured to combine the first signal and the second signal to form a combined signal. A phase feedback loop is configured to perform a phase adjustment to the combined signal to generate a phase adjusted signal. A gain feedback loop is configured to perform a gain adjustment to the phase adjusted signal to generate a gain adjusted signal. A subtractor is configured to subtract the adjusted signal from the first signal to generate a noise indicating signal that is subtracted from the combined signal to generate a filtered output signal. The phase adjustment and the gain adjustment are continually regulated based on the noise indicating signal.

DETAILED DESCRIPTION

Figure 1:
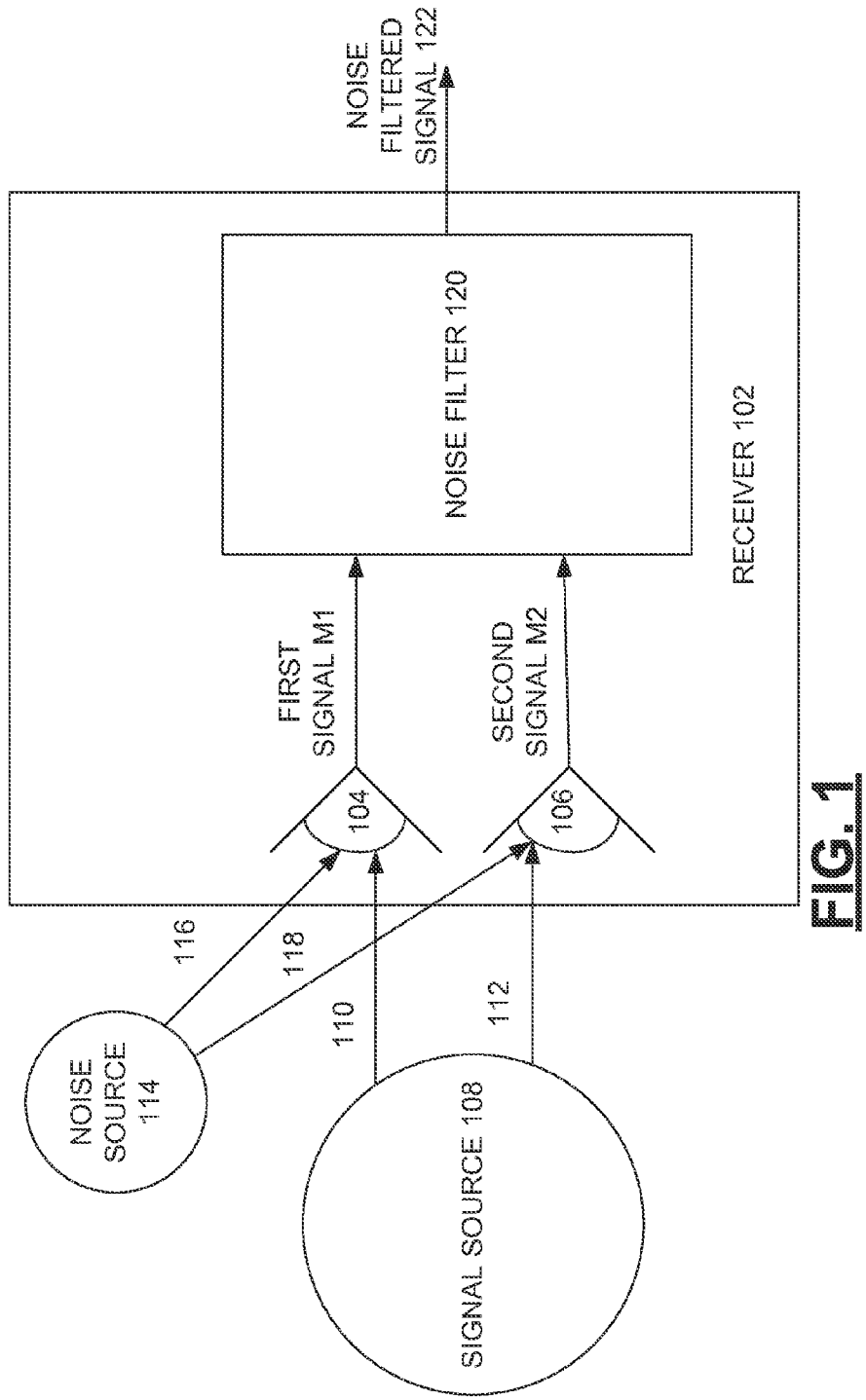
FIG. 1 is a diagram depicting a system for performing noise filtering of a received signal that utilizes two antennas.

FIG. 1 is a diagram depicting a system for performing spatial filtering of a received signal that utilizes two antennas. A receiver 102 includes a plurality of antennas 104, 106 configured to wirelessly receive a signal from a signal source 108. For example, when the receiver 102 is configured to receive audio signals, the two antennas 104, 106 can be implemented using microphones. The antennas 104, 106 are positioned orthogonally to a direction from which an incoming signal 110, 112 from the signal source 108 is expected to be received. Because the antennas 104, 106 are positioned orthogonally to the expected direction of travel of the incoming signal 110, 112, the incoming signal 110, 112 is received by the antennas 104, 106, respectively, at nearly the same time.

A communication channel through which the incoming signal 110, 112 is transmitted will often introduce a noise component from a noise source 114. For example, when the receiver is implemented in an audio context (e.g., as part of a cell phone microphone component), ambient noise from the noise source 114 is picked up by the microphones 104, 106. Because the noise source 114 is coming from a direction that is not orthogonal to the positioning of the antennas 104, 106, the antennas will receive the noise indicating signals 116, 118 at different times. In the example of FIG. 1, the first antenna 104 receives the noise indicating signal 116 before the second antenna 106 receives the noise indicating signal 118 due to the longer distance between the noise source 114 and those respective antennas. A noise filter 120 is configured to utilize the time differentiation of the receipt of the noise indicating signals 116, 118 to generate a noise filtered signal 122 that is as close as possible to the transmitted signal 110, 112 based on a first signal M1 provided by the first antenna 104 and a second signal M2 provided by the second antenna 106.

Figure 2:
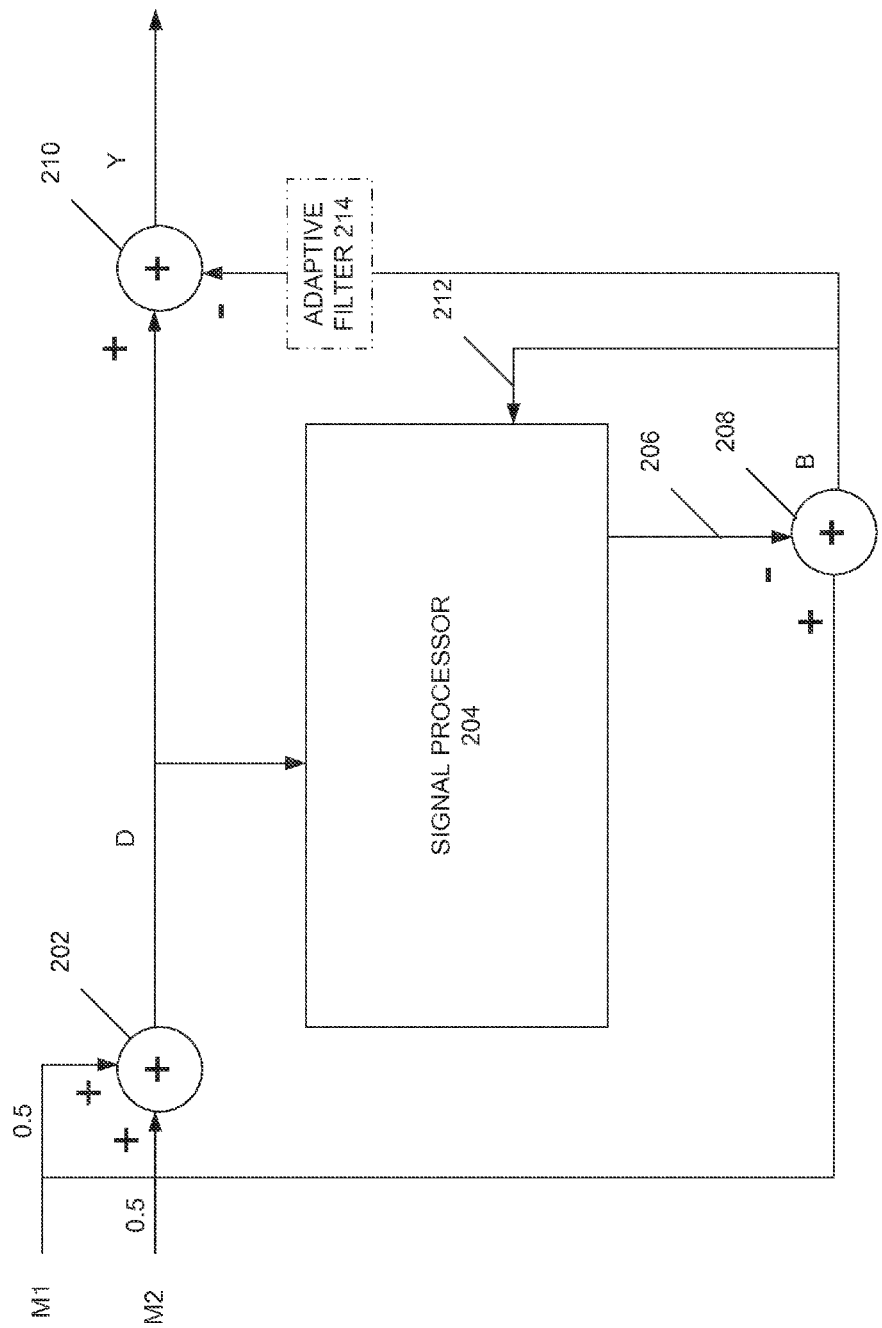
FIG. 2 is a block diagram depicting a system for performing noise filtering of a received signal.

FIG. 2 is a block diagram depicting a system for performing noise filtering of a received signal. A first antenna captures a first signal, and that first signal is provided as M1. A second antenna captures a second signal, and that second signal is provided as M2. Each of the first signal M1 and the second signal M2 has a desired signal component and a noise component. Referencing the example of FIG. 1, the signal source 108 is positioned such that the direction of travel of the desired signal 110, 112 is orthogonal to the positions of the antennas 104, 106. Thus, the desired signal 110, 112 is received by the first antenna 104 and the second antenna 106 almost simultaneously. In contrast, the noise source 114 is positioned at a different angle with respect to the antennas 104, 106 than the signal source 108. Thus, the noise indicating signal 116, 118 is received at different times by the antennas 104, 106 due to the differing distances travelled. Thus:

$$M1 = s + n; \text{ and}$$

$$M2 = (s \text{ delayed by } \delta s) + (n \text{ delayed by } \delta n),$$

where s is the desired signal, n is the noise, δs is the delay in receipt of the desired signal between the first antenna 104 and the second antenna 106, δn is the delay in receipt of the noise between the first antenna 104 and the second antenna 106, where δn will tend to be greater than Ss because the noise is coming from a direction other than the expected direction from which the desired signal is received, and the magnitude of s will tend to be larger than the magnitude of n.

The system of FIG. 2 utilizes the differing times of arrival of the desired signal and the noise at the antennas to filter the noise from the received first signal M1 and second signal M2 to output a filtered signal Y. At 202, the first signal M1 and the second signal M2 are combined, such as via an averaging operation where each of M1, M2 are multiplied by 0.5 and added together, to form an averaged signal D. When M1 and M2 are averaged to form D, D can be represented as:

$$D = (s \text{ delayed by } \delta s/2) + (n \text{ delayed by } \delta n/2).$$

A signal processor 204 receives the averaged signal D and processes that signal to generate an adjusted combined signal that is outputted at 206. The combined signal is adjusted such that the output at 206 is a representation of the desired signal received from the signal source. At 208, the output 206 is subtracted from the first signal M1 from the first antenna to generate a residual signal B that is representative of the noise received from the noise source. That noise indicating signal B is subtracted from the averaged signal D at 210 to generate a filtered output signal Y. In one embodiment, the nose signal B is provided to an adaptive filter 214 for processing prior to being subtracted from the averaged signal D at 210.

As noted above, the first signal M1 processed at 208 is composed of s+n, and the averaged signal D, without adjustment by the signal processor 204 is composed of (s delayed by δs/2)+(n delayed by δn/2). Because the desired signal portions of the first signal M1 and the averaged signal D are out of phase, the subtraction operation at 208 will likely not initially result in an accurate noise indicating signal B that does not include components of the desired signal s. Thus, the signal processor 204 is configured to perform a phase adjustment on the averaged signal D based upon feedback 212 from the noise indicating signal B. Because the desired signal portions (s) of the first signal M1 and the second signal M2 are expected to be substantially greater in magnitude than the noise portions (n), the signal processor 204 feedback loop 212 from B attempts to drive the noise indicating signal B to as low a level possible by adjusting the phase of the averaged signal D.

Figure 3:
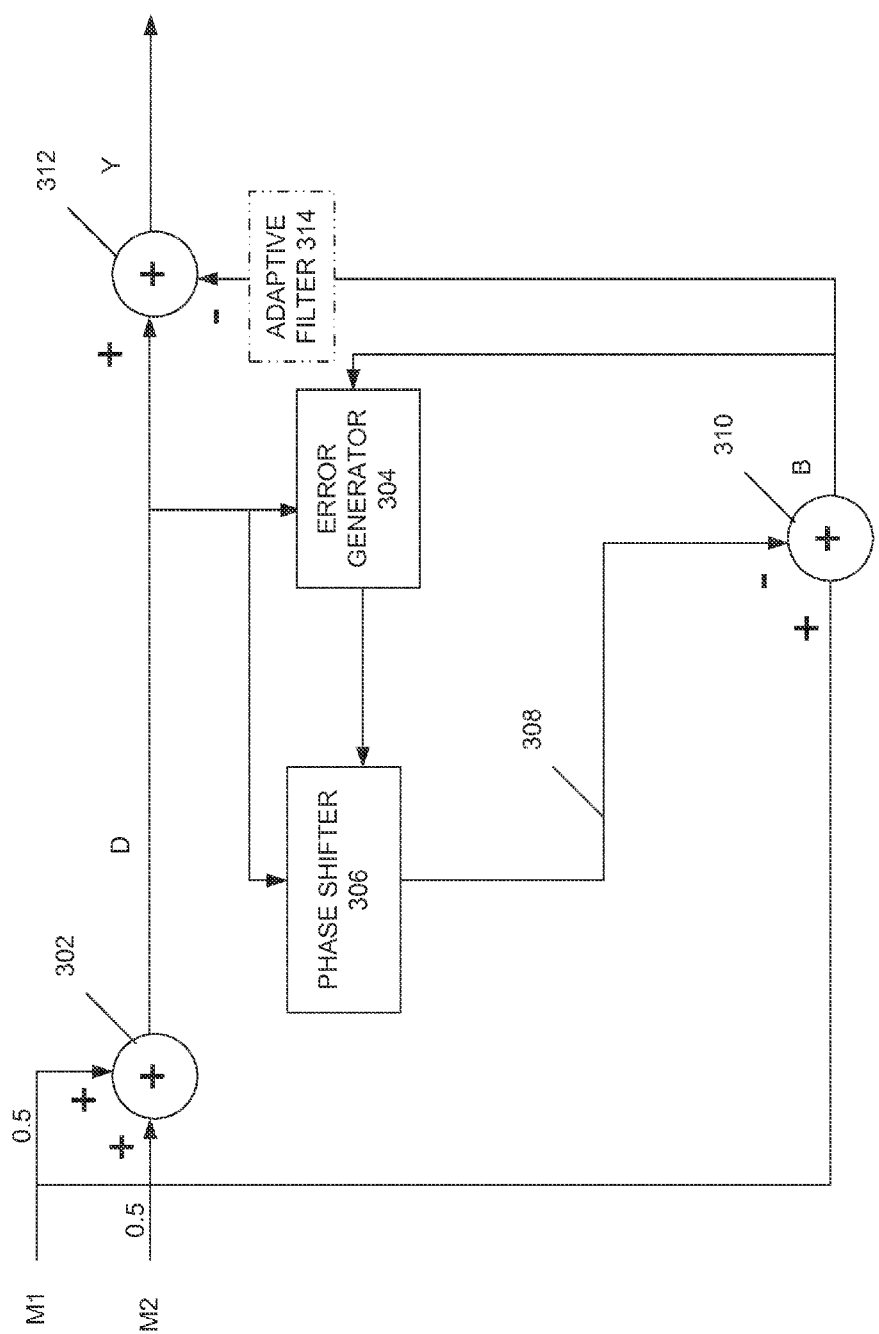
FIG. 3 is a block diagram depicting a signal processor performing a phase adjustment on a combined signal.

FIG. 3 is a block diagram depicting a signal processor performing a phase adjustment on a combined signal. A first antenna captures a first signal, and that first signal is provided as M1. A second antenna captures a second signal, and that second signal is provided as M2. At 302, the first signal M1 and the second signal M2 are combined to form an averaged signal D. The averaged signal D is provided to an error generator 304 and a phase shifter 306. The phase shifter 306 performs a phase adjustment on the combined signal B and outputs a phase adjusted signal 308. The phase adjusted signal 308 is subtracted from the first signal M1 at 310 to generate a noise indicating signal B. The noise indicating signal B is filtered by adaptive filter 314 and then is subtracted from the averaged signal D at 312 to generate a filtered output signal Y.

The noise indicating signal B is further provided to the error generator 304 that compares the noise indicating signal B with the averaged signal D. The error generator 304 instructs the phase shifter 306 to adjust the phase of the averaged signal D to match the signal portion of the averaged signal D with the signal portion of the first signal M1. When the magnitude of the noise indicating signal B is large, it is expected that components of the desired signal (s) remain in the noise indicating signal B and phase adjustment is commanded. As the magnitude of the noise indicating signal B becomes smaller, it becomes more likely that less of the desired signal component (s) remains in B, and smaller phase adjustments are commanded by the error generator 304. In one embodiment, the phase shifter is configured to adjust the phase of the averaged signal D by fractional delay units (e.g., 0.1 sampling interval) to facilitate fine tuning of the phase matching. In another embodiment, the phase shifter 306 is configured to saturate when the phase delay reaches a threshold to avoid erroneous phase matching using one of the noise components of the first signal M1 or the averaged signal D. The error generator 304 and the phase shifter 306 are then configured to reconverge the phase matching between the signal portions of M1 and D.

Figure 4:
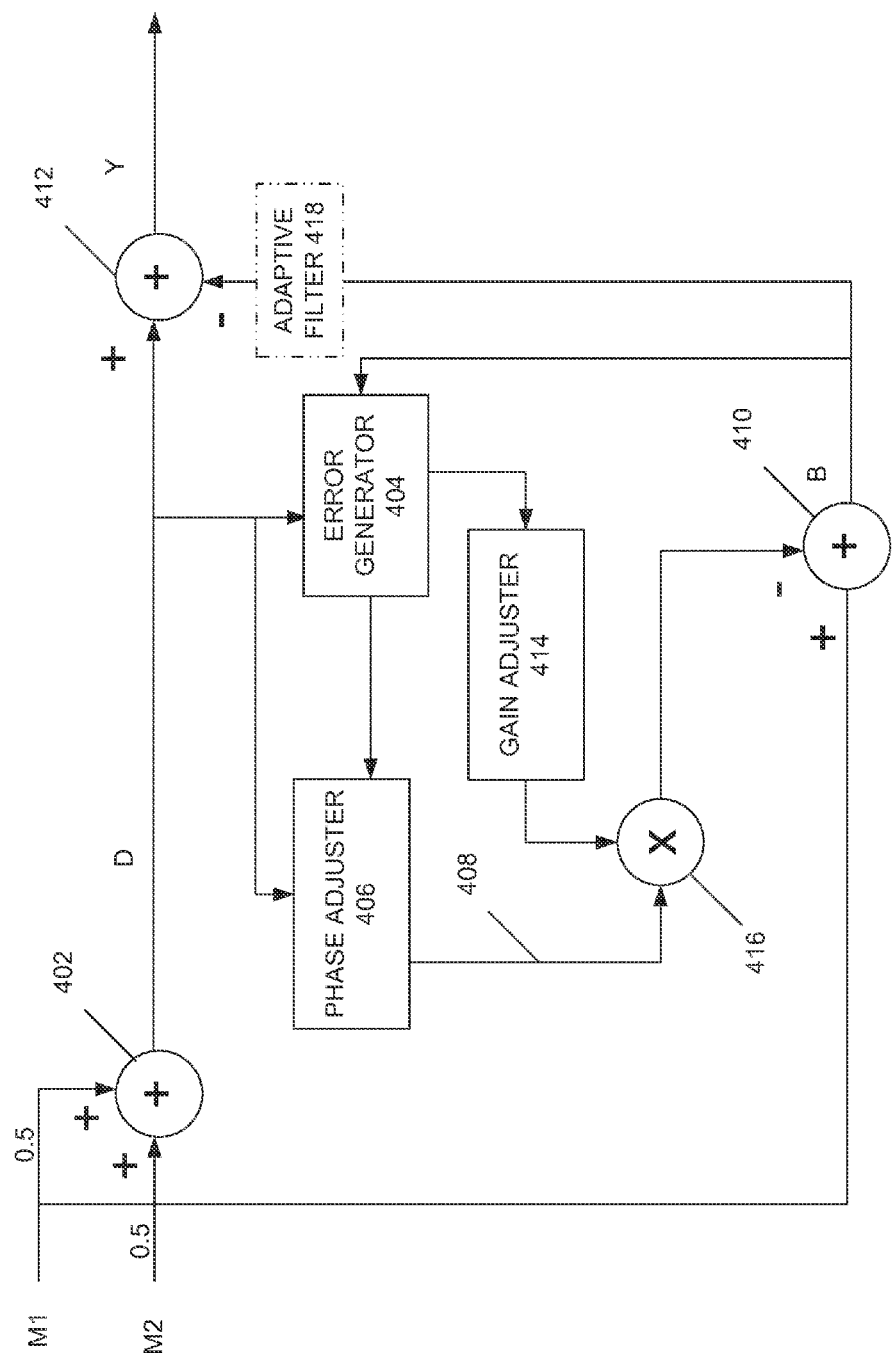
FIG. 4 is a block diagram depicting a signal processor performing a phase adjustment and a gain adjustment on a combined signal.

FIG. 4 is a block diagram depicting a signal processor performing a phase adjustment and a gain adjustment on a combined signal. It is possible in some implementations that the level of the signal portion of the first signal M1 and the averaged signal D may differ. For example, differences in the first antenna and second antenna (e.g., antennas 104, 106 in FIG. 1), could result in the combined signal (e.g., average of M1 and M2) having a different signal level component than the first signal M1 alone (e.g., based on sometimes minor hardware differences, such as microphone construction). Thus, the system of FIG. 4 incorporates a gain adjustment to further improve the match between the phase adjusted signal from the signal processor with signal portion of the first signal M1 to improve the accuracy of the noise indicating signal B.

A first antenna captures a first signal, and that first signal is provided as M1. A second antenna captures a second signal, and that second signal is provided as M2. At 402, the first signal M and the second signal M2 are averaged to form an averaged signal D. The averaged signal D is provided to an error generator 404 and a phase shifter 406. The phase shifter 406 performs a phase adjustment on the averaged signal D and outputs a phase adjusted signal 408. The phase adjusted signal 408 is subtracted from the first signal M1 at 410 to generate a noise indicating signal B. The noise indicating signal B is filtered by adaptive filter 418 and then is subtracted from the averaged signal D at 412 to generate a filtered output signal Y.

As described above with respect to FIG. 3, the noise indicating signal B is further provided to the error generator 404 that compares the noise indicating signal B with the averaged signal D. The error generator 404 instructs the phase shifter 406 to adjust the phase of the averaged signal D to match the signal portion of the averaged signal D with the signal portion of the first signal M1. In addition, the error generator 404 provides a command signal to a gain adjuster 414 to provide a gain adjustment on the phase adjusted signal 408 at 416 prior to subtracting the phase adjusted signal 408 from the first signal M1. In one embodiment, the command from the error generator 404 to the gain adjuster 414 further seeks to minimize the power of the noise indicating signal B, assuming that any high magnitude components of the noise indicating signal B is based on mismatches in signal portion (s) between M1 and D.

Figure 5:
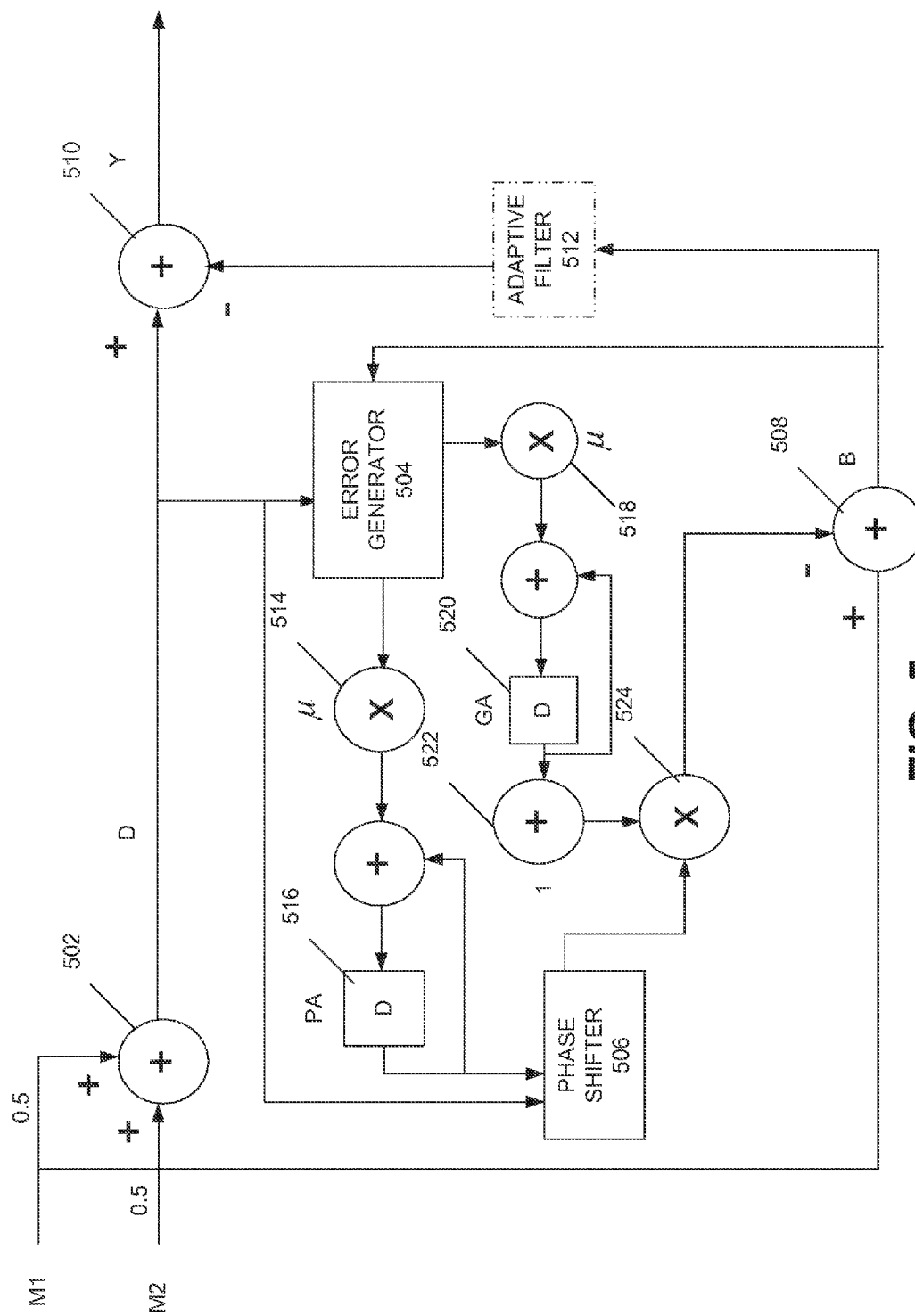
FIG. 5 is a block diagram depicting an example implementation of a system performing noise filtering of a received signal.

FIG. 5 is a block diagram depicting an example implementation of a system performing noise filtering of a received signal. A first antenna captures a first signal, and that first signal is provided as M1. A second antenna captures a second signal, and that second signal is provided as M2. At 502, the first signal M1 and the second signal M2 are averaged to form an averaged signal D. The averaged signal D is provided to an error generator 504. The error generator 504 provides a command signal to phase shifting circuitry that culminates with a phase shifter 506 that outputs a phase adjusted version of the averaged signal D that is subtracted from the first signal M1 at 508 to generate a noise indicating signal B. The noise indicating signal B is subtracted from the averaged signal D at 510 to generate a filtered output signal Y. In one embodiment, the noise indicating signal B is processed by a filter 512, such as an adaptive filter, before being subtracted from the averaged signal D at 510.

The noise indicating signal B is further provided to the error generator 504 that compares the noise indicating signal B with the averaged signal D. In one embodiment, the error generator is configured to output a command signal to the downstream phase shifting circuitry according to:

Error Generator$_{phase}$=$(D_2-D_4)*b$, where $D_2$ is the averaged signal D delayed by two units, $D_4$ is the averaged signal D delayed by four units, and b is the noise indicating signal.

The error generator 504 instructs the phase shifting circuitry to adjust the phase of the averaged signal D to match the signal portion of the averaged signal D with the signal portion of the first signal M1. In the implementation of FIG. 5, the error signal (e.g., $(D_2-D_4)*b$) from the error generator 504 is multiplied by a step size μ at 514, with the result being provided to a phase accumulator at 516. The phase accumulator is updated according to $pa'=pa+\mu(D_2-D_4)*b$, where pa is the phase accumulator value at the present clock cycle, pa' is the phase accumulator value at the next clock cycle, μ is the step size, and $(D_2-D_4)*b$ is the signal provided by the error generator 504. The pa' signal is provided to the phase shifter 506 to command phase adjustment of the averaged signal D.

In addition, the error generator 504 provides a command signal to a gain adjusting circuitry to provide a gain adjustment on the phase adjusted signal from the phase shifter 506 prior to subtracting the phase adjusted signal from the first signal M1 at 508. In one embodiment, the error generator is configured to output a command signal to the downstream gain adjusting circuitry according to:

Error Generator=$D_3*b$, where $D_3$ is the averaged signal D delayed by three units and b is the noise indicating signal.

The error generator 504 instructs the gain adjusting circuitry to adjust the gain of the averaged signal D to match the signal portion of the averaged signal D with the signal portion of the first signal M1. In the implementation of FIG. 5, the error signal (e.g., $D_3*b$) from the error generator 504 is multiplied by a step size μ at 518, with the result being provided to a gain accumulator at 520. The gain accumulator is updated according to $ga'=ga+\mu*D_3*b$, where ga is the gain accumulator value at the present clock cycle, ga' is the gain accumulator value at the next clock cycle, μ is the step size, and $D_3*b$ is the signal provided by the error generator 504. A value of 1 is added to the ga' signal at 522 and that signal is multiplied by the phase adjusted signal from the phase shifter 506 at 524 prior to the phase adjusted signal being subtracted from the first signal M1.

Figure 6:
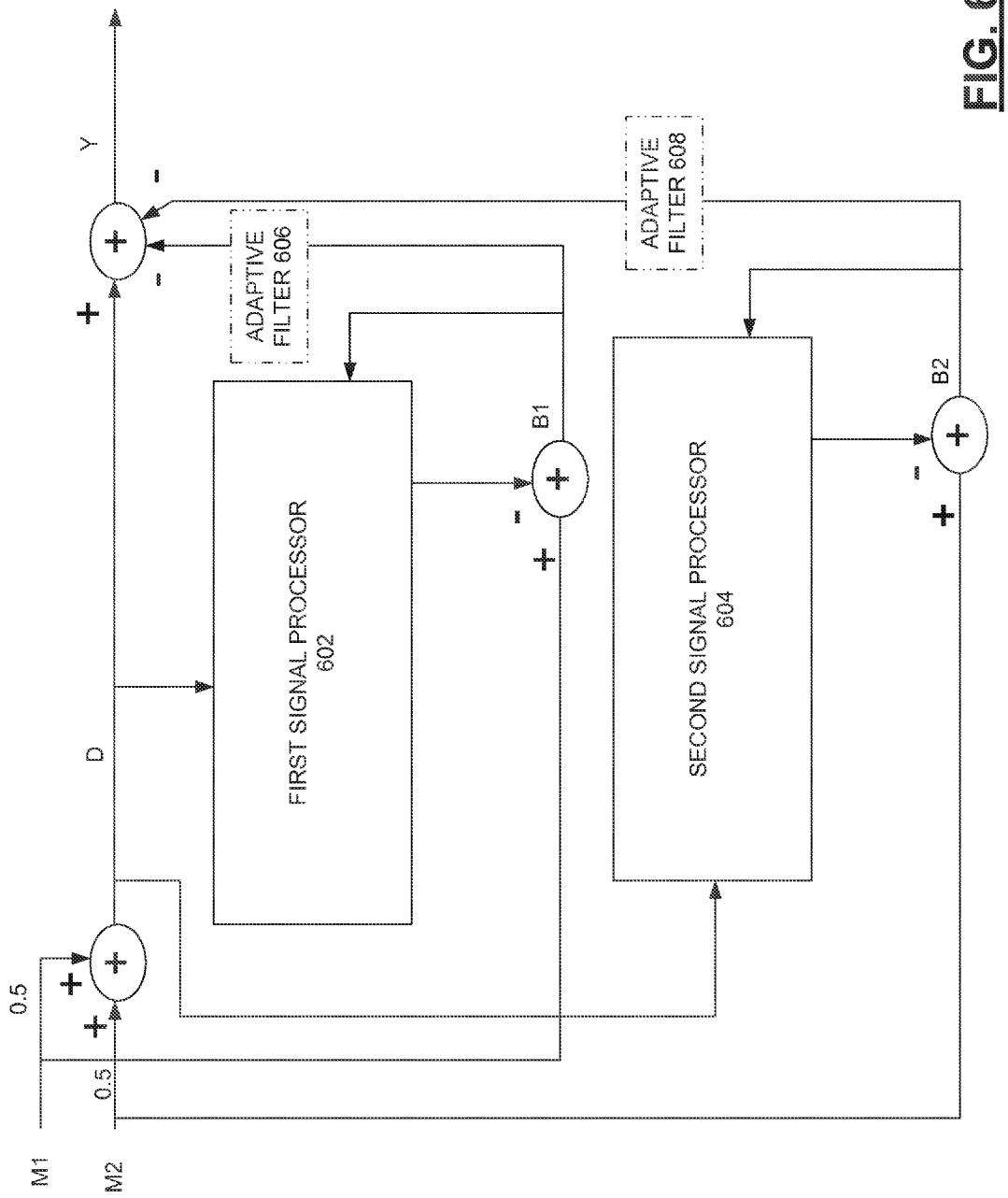
FIG. 6 is a block diagram depicting a first signal processor generating a first noise indicating signal B1 based on the averaged signal D and the first signal M1 and a second signal processor generating a second noise indicating signal based on the averaged signal D and the second signal M2.

While the description of the previous figures has focused on generating a noise indicating signal based on the averaged signal D and the first signal M1, a system for performing noise filtering of a received signal can be configured to further provide a second noise indicating signal based on the averaged signal D and the second signal M2. FIG. 6 is a block diagram depicting a first signal processor generating a first noise indicating signal B1 based on the averaged signal D and the first signal M1 and a second signal processor generating a second noise indicating signal based on the averaged signal D and the second signal M2. A first signal processor 602 receives an averaged signal D that is based on a first signal M1 and a second signal M2. The first signal processor 602 processes the averaged signal D in view of the first signal M1, such as according to one of the processes described herein above, to generate a first noise indicating signal B1. Similarly, a second signal processor 604 receives the averaged signal D and processes the averaged signal D in view of the second signal M2, such as using a similar process as described herein above, to generate a second noise indicating signal B2. The first noise indicating signal B1 and the second noise indicating signal B2 may be processed or scaled and then are subtracted from the averaged signal D to generate a filtered output signal Y.

Figure 7:
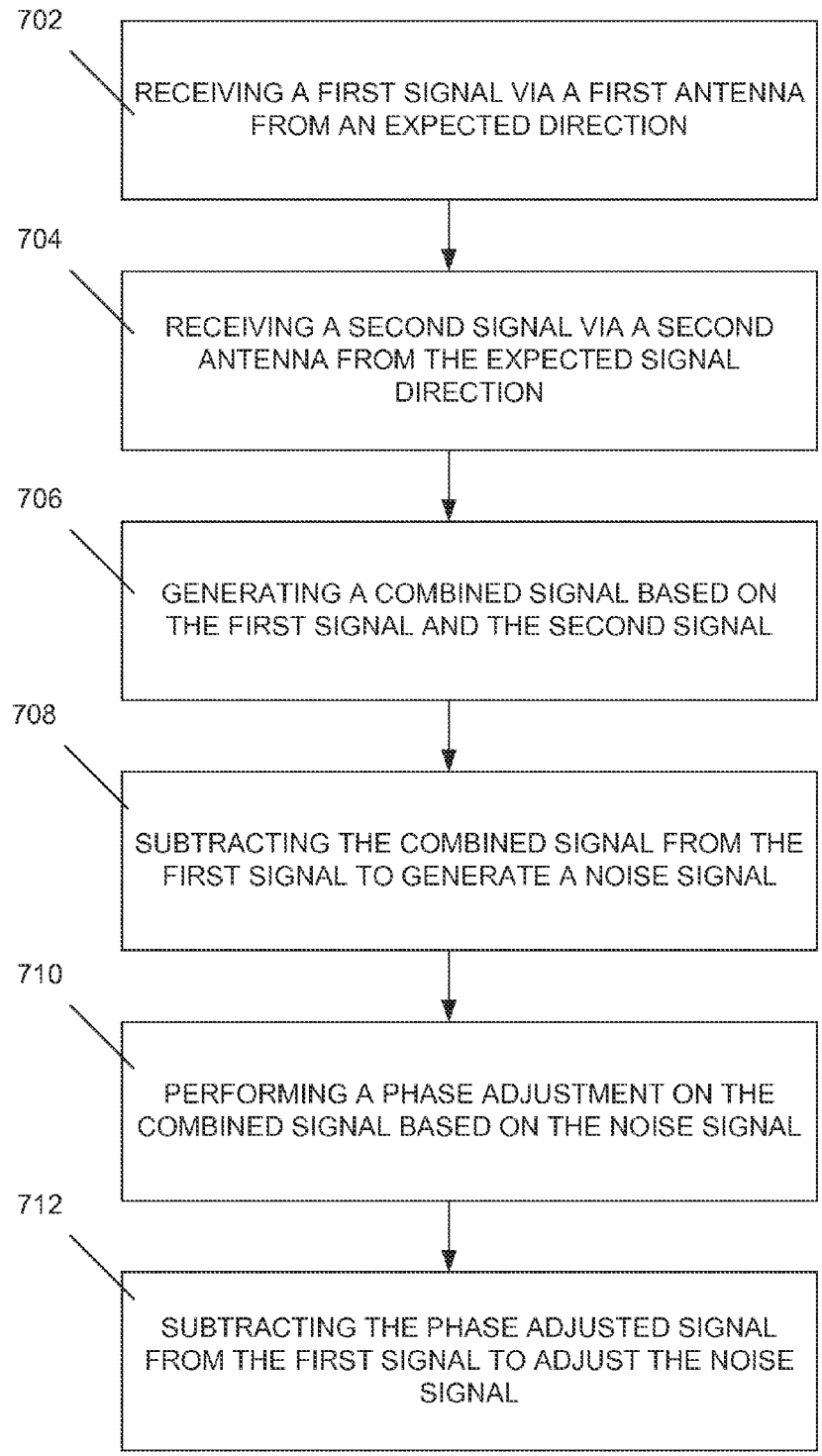
FIG. 7 is a flow diagram depicting a method of performing noise filtering of a received signal.

FIG. 7 is a flow diagram depicting a method of performing noise filtering of a received signal. At 702, a first signal is received via a first antenna. At 704, a second signal is received via a second antenna, where a desired signal is received at the two antennas at about the same time, while noise received from directions other than the expected signal direction is received at the first antenna and the second antenna at different times. At 706, an averaged signal is generated based on the first signal and the second signal. At 708, the averaged signal is subtracted from the first signal to generate a noise indicating signal. At 710, a phase adjustment is performed on the averaged signal based on the noise indicating signal, and at 712, the phase adjusted signal is subtracted from the first signal to create the noise indicating signal. The noise indicating signal is filtered and then subtracted from the averaged signal to generate a filtered output signal.

Figure 8:
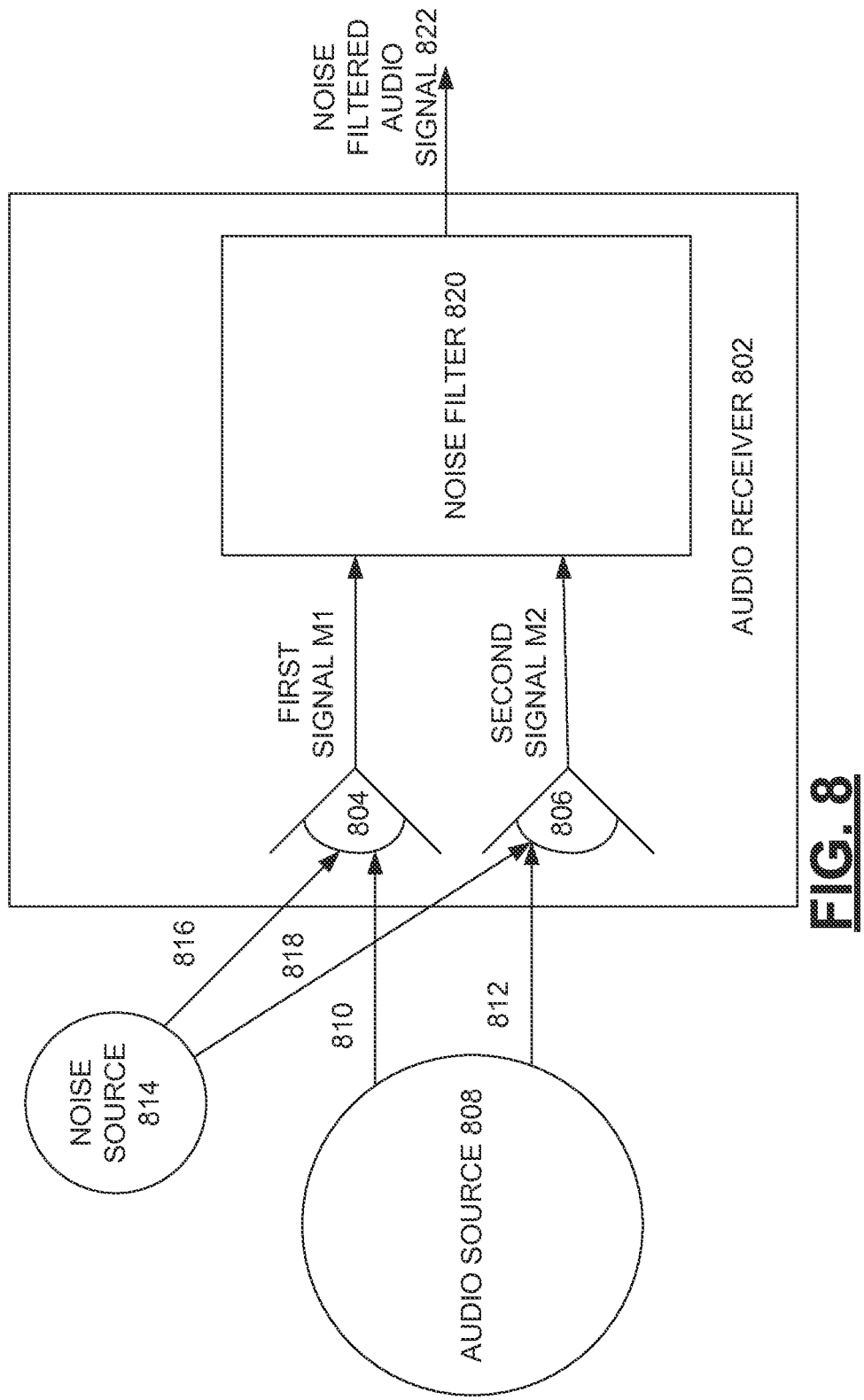
FIG. 8 is a diagram depicting the acquisition of a first signal M1 and a second signal M2 in an audio processing context.

The systems and methods described herein can be implemented in a variety of contexts. FIG. 8 is a diagram depicting the acquisition of a first signal M1 and a second signal M2 in an audio processing context, such as as part of a cell phone microphone component. An audio receiver 802 includes a plurality of microphones 804, 806 configured to receive an audio signal from an audio source 808. The microphones 804, 806 are positioned orthogonally to a direction from which an incoming audio signal 810, 812 from the audio source 808 is expected to be received. Because the microphones 804, 806 are positioned orthogonally to the expected direction of travel of the incoming audio signal 810, 812, the incoming signal 810, 812 is received by the microphones 804, 806, respectively, at nearly the same time.

The communication channel through which the incoming audio signal 810, 812 is transmitted will often introduce a noise component from a noise source 814. For example, ambient noise from the noise source 814 is picked up by the microphones 804, 806. Because the noise source 814 is coming from a direction that is not orthogonal to the positioning of the microphones 804, 806, the microphones will receive the noise indicating signals 816, 118 at different times. In the example of FIG. 8, the first microphone 804 receives the noise indicating signal 816 before the second microphone 806 receives the noise indicating signal 818 due to the longer distance between the noise source 814 and those respective microphones. A noise filter 820 is configured to utilize the time differentiation of the receipt of the noise indicating signals 816, 818 to generate a noise filtered audio signal 822 that is as close as possible to the transmitted audio signal 810, 812.

This application uses examples to illustrate the invention. The patentable scope of the invention includes other examples. For example, the incoming signal in other implementations may be a WiFi signal, a radio wave signal, a sonar signal, or any other electromagnetic signal.

It is claimed:

1. A system for performing noise filtering of a received signal, comprising:
    a first receiver configured to capture a first signal;
    a second receiver configured to capture a second signal, wherein a desired signal is received at the first receiver and the second receiver substantially simultaneously, wherein noise received from directions other than an expected signal direction is received at the first antenna and the second antenna at different times;
    a signal processor configured to:
        generate a combined signal based on the first signal and the second signal;
        subtract the combined signal from the first signal to generate a noise indicating signal;
        perform a phase adjustment on the combined signal based on the noise indicating signal;
        subtract the phase adjusted signal from the first signal to recreate the noise indicating signal;
        wherein the noise indicating signal is subtracted from the combined signal to generate a filtered output signal.

2. The system of claim 1, wherein the first signal comprises a first desired signal portion and a first noise portion, and wherein the second signal comprises a second desired signal portion and a second noise portion.

3. The system of claim 2, wherein the signal processor is configured to perform the phase adjustment on the combined signal to match a desired signal portion of the combined signal with the desired signal portion of the first signal.

4. The system of claim 3, wherein the phase adjusted signal is a representation of the first desired signal portion, wherein the noise indicating signal after subtraction of the phase adjusted signal is a representation of the first noise portion.

5. The system of claim 1, wherein the signal processor is further configured to:
    perform a gain adjustment on the phase adjusted signal based on the noise indicating signal prior to subtracting the phase adjusted signal from the first signal.

6. The system of claim 5, wherein the signal processor comprises a phase shifting feedback loop and a gain adjusting feedback loop having combined outputs that generate the phase adjusted signal.

7. The system of claim 1, further comprising a filter configured to process the noise indicating signal prior to the noise indicating signal being subtracted from the combined signal.

8. The system of claim 1, wherein the signal processor is configured to continue to recreate the noise indicating signal by performing the phase adjustment of the combined signal based on the noise indicating signal via a feedback loop.

9. The system of claim 1, wherein the signal processor is further configured to:
    generate a second noise indicating signal based on the combined signal and the second signal;
    wherein the second noise indicating signal is also subtracted from the combined signal to generate the filtered output signal.

10. The system of claim 9, wherein generating the second noise indicating signal comprises:
    subtracting the combined signal from the second signal to generate the second noise indicating signal;
    performing a phase adjustment on the combined signal based on the second noise indicating signal to generate a second phase adjusted combined signal; and
    subtracting the second phase adjusted combined signal from the second signal to adjust the second noise indicating signal.

11. The system of claim 1, wherein the received signal is an audio signal, an electromagnetic signal, a radio wave signal, or a WiFi signal.

12. The system of claim 1, wherein the first antenna and the second antenna are positioned orthogonally to the expected signal direction.

13. A method for performing noise filtering of a received signal, comprising:
    receiving a first signal via a first receiver;
    receiving a second signal via a second receiver, wherein a desired signal is received at the first receiver and the second receiver substantially simultaneously, wherein noise received from directions other than an expected signal direction is received at the first antenna and the second antenna at different times;
    generating a combined signal based on the first signal and the second signal;
    subtracting the combined signal from the first signal to generate a noise indicating signal;
    performing a phase adjustment on the combined signal based on the noise indicating signal;
    subtracting the phase adjusted signal from the first signal to recreate the noise indicating signal;
    wherein the noise indicating signal is subtracted from the combined signal to generate a filtered output signal.

14. The method of claim 13, wherein the first signal comprises a first desired signal portion and a first noise portion, and wherein the second signal comprises a second desired signal portion and a second noise portion.

15. The method of claim 14, wherein the signal processor is configured to perform the phase adjustment on the combined signal to match a desired signal portion of the combined signal with the desired signal portion of the first signal.

16. The system of claim 13, further comprising
generating a second noise indicating signal based on the combined signal and the second signal;
wherein the second noise indicating signal is also subtracted from the combined signal to generate the filtered output signal.

17. The system of claim 16, wherein generating the second noise indicating signal comprises:
subtracting the combined signal from the second signal to generate the second noise indicating signal;
performing a phase adjustment on the combined signal based on the second noise indicating signal to generate a second phase adjusted combined signal; and
subtracting the second phase adjusted combined signal from the second signal to recreate the second noise indicating signals.

18. A system for performing noise filtering of a received signal, comprising:
a first receiver configured to capture a first signal;
a second receiver configured to capture a second signal, wherein a desired signal is received at the first receiver and the second receiver substantially simultaneously, wherein noise received from directions other than the expected signal direction is received at the first antenna and the second antenna at different times;
an adder configured to combine the first signal and the second signal to form a combined signal;
a phase feedback loop configured to perform a phase adjustment to the combined signal to generate a phase adjusted signal;
a gain feedback loop configured to perform a gain adjustment to the phase adjusted signal to generate an adjusted signal;
a subtractor configured to subtract the adjusted signal from the first signal to generate a noise indicating signal that is subtracted from the combined signal to generate a filtered output signal;
wherein the phase adjustment and the gain adjustment are continually regulated based on the noise indicating signal.

* * * * *